Sept. 14, 1954   J. R. GLAYZER   2,689,142
EXTERNAL PACKING DEVICE FOR PIPE FITTINGS
Filed Dec. 10, 1951

INVENTOR.
J. R. GLAYZER
BY *Hudson and Young*
ATTORNEYS

Patented Sept. 14, 1954

2,689,142

UNITED STATES PATENT OFFICE 2,689,142

EXTERNAL PACKING DEVICE FOR PIPE FITTINGS

James R. Glayzer, Kansas City, Kans., assignor to Phillips Petroleum Company, a corporation of Delaware Application December 10, 1951, Serial No. 260,864

2 Claims. (Cl. 285—152)

This invention relates to an improved packed coupling for pipe joints. In one aspect this invention relates to a device for controlling a leak at a threaded pipe connection. In still another aspect this invention relates to a device which prevents separation of a threaded pipe from a threaded fitting connection upon failure of the threaded connection.

Leaks often develop in threaded connections resulting in a premature shut down of the plant or part of the plant to tighten the connection or to replace a worn out pipe. Such occurrences are especially encountered in steam and water lines and in lines conducting corrosive materials. These failures occur most frequently at a turn in the pipe such as at an ell connection.

In at least one aspect of the invention at least one of the following objects is obtained.

An object of this invention is to provide a packed coupling for pipe joints.

A further object of this invention is to provide a device for controlling a leak in the threaded connection of a pipe and fitting.

A further object is to provide a device for compressing packing material about a threaded pipe and ell connection and for preventing separation of the pipe and the ell in case of failure of the threads of the connection.

A further object is to provide a device which compresses a packing material against both the fitting and the leaking thread surface of the pipe.

The provision of a pipe coupling device which is adjustable and adaptable to various applications and uses is a further object of this invention.

Other objects will be apparent to one skilled in the art upon reading the specification and drawing.

The present invention is described as applied to a threaded ell connection but it is within the scope of the invention to apply the device to a T connection or to apply a modification of the device to other fittings.

Figure 1:
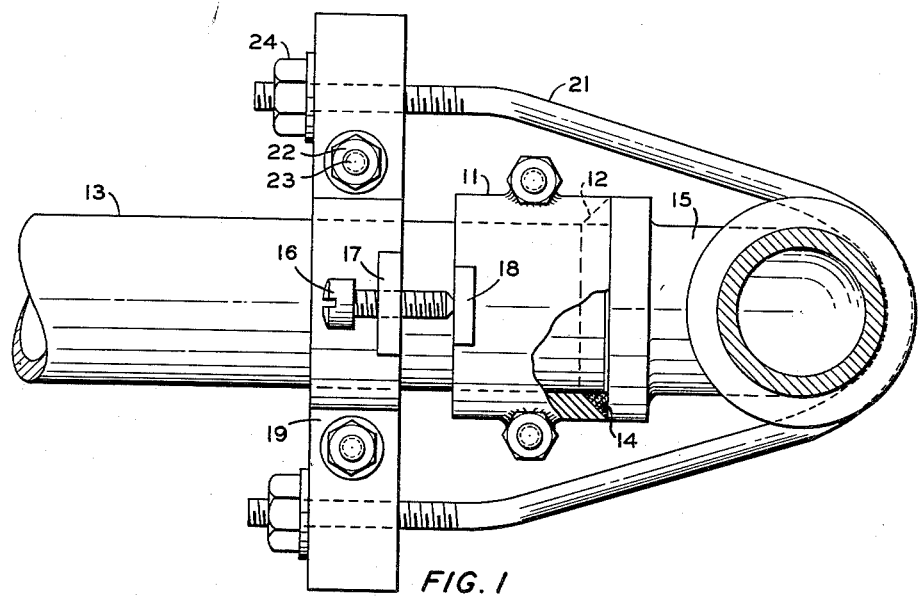
Figure 2:
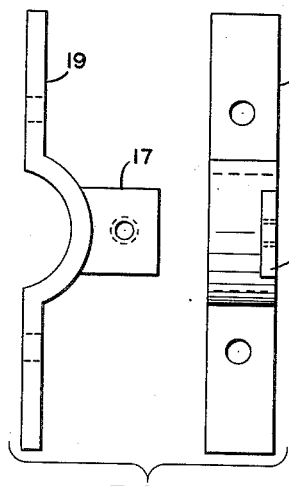
Figure 3:
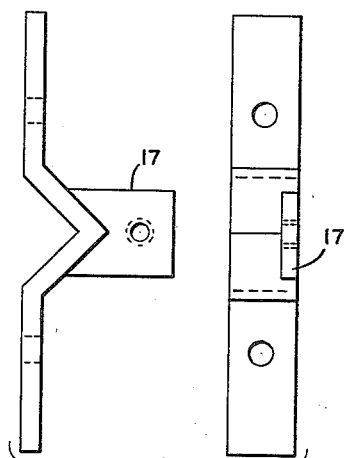
Figure 4:
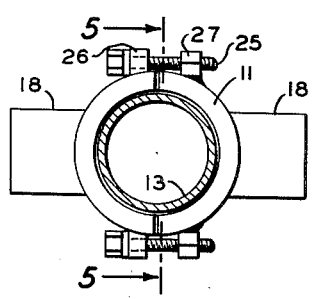
Figure 5:
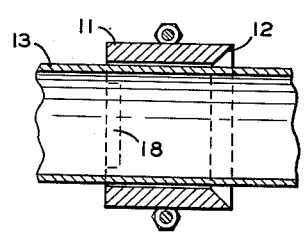

Referring to the drawing, Figure 1 is a side elevation and partial section of the device. Figure 2 is an end and side elevation of one-half of the anchor clamp. Figure 3 shows a modification of the anchor clamp. Figure 4 is an end elevation of the packing clamp. Figure 5 is a sectional view of the packing clamp along the line 5—5. The numbers refer to the same elements in all of the various figures.

Referring now to Figure 1, the packing clamp 11 having a beveled packing gasket recess 12 fits slidably on pipe 13 and compresses the packing gasket 14 against the pipe 13 and the ell 15.

Pressure is applied to the packing clamp 11 by tightening set screws 16, which pass through the ears 17 so as to act upon the ears 18 to force the packing clamp 11 toward the ell 15.

Anchor clamp 19 fits firmly upon pipe 13 as a result of tightening nuts 22 upon the bolts 23. Anchor bolt 21 is a U-bolt whose two ends pass between the two halves of the anchor clamp and the anchor clamp is thus secured to the ell by tightening nuts 24.

Figures 2–3 and 4–5 show the anchor clamp and packing clamp respectively. Figure 3 shows a modification of the anchor clamp which is designed to provide a grip upon the pipe wherein pressure is applied to points that tend to dig into the surface of the pipe. Obviously other forms of clamping structures can be employed in the practice of this invention without departing from the scope of this disclosure.

The halves of clamp 11 are secured together by bolt 25 through welded washer 26 and welded nut 27.

Thus according to the practice of this invention, a packing device for a leaking threaded connection has been provided wherein an anchor clamp having laterally extending projections containing adjustable screws, is fastened securely around the pipe having the leaking threads; a U-bolt secures the clamp to the fitting; a split collar having an inside diameter larger than the outside diameter of the pipe, a beveled packing recess and laterally extending projections fits slidably around the pipe between the anchor clamp and fitting so that the adjustable screws in the projections of the anchor clamp press against the projections of the slidable, split collar and force packing material against the threads and the fitting.

Advantages of the device of the invention include simplicity of construction and of operation. Another advantage is that the pipe is secured to the ell by means of the anchor clamp and anchor bolt. Another advantage is that the device can be used on very short sections of pipe.

The device of the invention has been successfully employed to control leaks in threaded connections on steam pipe lines holding from 100 to 400 pounds per square inch steam pressure, and on high pressure oil pipe lines.

This device is primarily intended for emergency and temporary use such as the control of a leak until such time as the pipe having the bad order threads can be replaced, however, some installations have been left in service for extended periods of time.

In some cases it has been found, upon removing the device to replace the worn pipe, that the pipe threads were completely worn through so that the pipe and fitting were separated. The feature of the anchor bolt securing the pipe clamp to the fitting thus prevents a blow-out in case of complete failure of the threaded connection.

Reasonable variation and modification are possible within the scope of the disclosure of the present invention, the essence of which, is that a packing clamp has been provided for a threaded connection which prevents separation of the pipe and connection in case of failure of the threaded connection.

I claim:

1. A packing device for controlling a leak in a threaded pipe and fitting connection and for preventing separation of the pipe and fitting in the event of failure of the threaded connection which comprises a removable packing follower means adapted so as to slideably encircle the pipe adjacent the connection; clamping means composed of sections adapted so as to encircle and immovably grip said pipe, said sections extending radially from said pipe for a distance greater than the outside dimensions of said packing follower means; a fastener band having its ends secured to said clamping means, an intermediate portion of said band extending around and engaging said fitting to immovably secure said clamping means to said fitting, said band being spaced from said pipe a distance sufficient so as to permit adjustment, removal and replacement of said packing follower; and means connected to said clamping means for forcing said packing follower toward said fitting.

2. A packing device for controlling a leak in a threaded pipe and fitting connection and for preventing separation of the pipe and fitting in the event of failure of the threaded connection which comprises an annular packing gasket surrounding the pipe at said threaded connection; a split ring packing follower adapted so as to fit slideably around said pipe adjacent said fitting and to force said gasket into contact with said pipe and fitting; an anchor clamp adapted so as to immovably grip said pipe adjacent said packing follower, the ends of the halves of said anchor clamp extending radially from said pipe for a distance greater than the outside dimensions of said packing follower; a U-bolt encircling said fitting and connected to the extended ends of said anchor clamp so as to immovably secure said pipe to said fitting, the arms of said U-bolt being spaced from said pipe a distance sufficient so as to permit adjustment, removal and replacement of said packing follower; and set screws passing through said anchor clamp and bearing upon said packing follower so as to force said packing follower and packing into contact with said threaded connection.

References Cited in the file of this patent

UNITED STATES PATENTS

| Number | Name | Date |
|---|---|---|
| 646,754 | Nusbaum | Apr. 3, 1900 |
| 801,596 | Kerr et al. | Oct. 10, 1905 |
| 863,901 | Brumbaugh | Aug. 20, 1907 |
| 1,600,561 | O'Connor | Sept. 21, 1926 |
| 2,366,341 | Lappin | Jan. 2, 1945 |